United States Patent
Dixon et al.

(10) Patent No.: US 8,959,337 B2
(45) Date of Patent: Feb. 17, 2015

(54) DIGITAL CERTIFICATE ISSUER-CORRELATED DIGITAL SIGNATURE VERIFICATION

(75) Inventors: Bret W. Dixon, South Perth (AU); Jonathan L. Rumsey, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/532,155

(22) Filed: Jun. 25, 2012

(65) Prior Publication Data
US 2013/0346743 A1 Dec. 26, 2013

(51) Int. Cl.
H04L 29/06 (2006.01)
H04L 9/32 (2006.01)

(52) U.S. Cl.
CPC ............ *H04L 9/3263* (2013.01); *H04L 9/3265* (2013.01); *H04L 63/0823* (2013.01)
USPC ............................. 713/157; 713/156; 713/158

(58) Field of Classification Search
CPC . H04L 63/0823; H04L 9/3263; H04L 9/3268; H04L 63/0442; H04L 63/12; H04L 9/3247; H04L 9/3265
USPC .................................................. 713/155–159
See application file for complete search history.

(56) References Cited

U.S. PATENT DOCUMENTS

| | | | | |
|---|---|---|---|---|
| 6,301,658 B1 * | 10/2001 | Koehler | ........................ | 713/155 |
| 6,915,430 B2 * | 7/2005 | Wheeler et al. | ................ | 713/170 |
| 7,103,911 B2 * | 9/2006 | Spies et al. | ........................ | 726/3 |
| 7,124,294 B2 * | 10/2006 | Kawamura et al. | ........... | 713/156 |
| 7,313,689 B2 * | 12/2007 | Falch et al. | .................... | 713/155 |
| 7,478,236 B2 * | 1/2009 | Roh et al. | ...................... | 713/157 |
| 7,549,043 B2 * | 6/2009 | Adams et al. | ................. | 713/156 |
| 8,028,333 B2 * | 9/2011 | Falch et al. | ..................... | 726/10 |
| 2001/0034834 A1 * | 10/2001 | Matsuyama et al. | .......... | 713/156 |
| 2002/0078347 A1 * | 6/2002 | Hericourt et al. | ............. | 713/156 |
| 2003/0014629 A1 * | 1/2003 | Zuccherato | .................... | 713/156 |
| 2004/0030888 A1 * | 2/2004 | Roh et al. | ...................... | 713/156 |
| 2004/0054889 A1 * | 3/2004 | Pitsos | ........................... | 713/156 |
| 2008/0016335 A1 * | 1/2008 | Takahashi et al. | ............. | 713/156 |
| 2008/0028454 A1 * | 1/2008 | Falch et al. | ..................... | 726/10 |
| 2008/0301439 A1 * | 12/2008 | Hashimoto et al. | ........... | 713/156 |
| 2009/0106557 A1 * | 4/2009 | Leonard | ......................... | 713/179 |
| 2010/0031027 A1 * | 2/2010 | Thomas et al. | ............... | 713/156 |
| 2010/0122081 A1 * | 5/2010 | Sato et al. | ...................... | 713/158 |
| 2011/0004763 A1 * | 1/2011 | Sato et al. | ...................... | 713/175 |
| 2011/0099381 A1 * | 4/2011 | Brown et al. | ................. | 713/176 |
| 2011/0154024 A1 * | 6/2011 | Ignaci et al. | .................. | 713/156 |

FOREIGN PATENT DOCUMENTS

WO 2009052524 A2 4/2009

OTHER PUBLICATIONS

United States Patent and Trademark Office, Office Action for U.S. Appl. No. 13/912,774, Aug. 14, 2014, pp. 1-13, Alexandria, VA, USA.

* cited by examiner

*Primary Examiner* — Tae Kim
(74) *Attorney, Agent, or Firm* — Lee Law, PLLC; Christopher B. Lee

(57) ABSTRACT

A message including a digital signature is received at a processor. It is determined whether a specific authorized certificate issuer is configured for a message originator within a data protection policy. In response to determining that the specific authorized certificate issuer is configured for the message originator within the data protection policy, it is determined whether a message originator certificate used to generate the digital signature is issued by the configured specific authorized certificate issuer.

10 Claims, 5 Drawing Sheets

DIGITAL CERTIFICATE ISSUER-CORRELATED DIGITAL SIGNATURE VERIFICATION

BACKGROUND

The present invention relates to digital signature verification. More particularly, the present invention relates to digital certificate issuer-correlated digital signature verification.

In message queuing environments, messages may be digitally signed to identify the originator of the message and to ensure upon receipt that the message was not modified while in transit. One method of digitally signing messages is to use Public Key Infrastructure (PKI).

BRIEF SUMMARY

A method includes receiving, at a processor, a message comprising a digital signature; determining whether a specific authorized certificate issuer is configured for a message originator within a data protection policy; and, in response to determining that the specific authorized certificate issuer is configured for the message originator within the data protection policy, determining whether a message originator certificate used to generate the digital signature is issued by the configured specific authorized certificate issuer.

A system includes a memory configured to store a data protection policy and a processor programmed to receive a message comprising a digital signature; determine whether a specific authorized certificate issuer is configured for a message originator within the data protection policy; and, in response to determining that the specific authorized certificate issuer is configured for the message originator within the data protection policy, determine whether a message originator certificate used to generate the digital signature is issued by the configured specific authorized certificate issuer.

A computer program product includes a computer readable storage medium including computer readable program code, where the computer readable program code when executed on a computer causes the computer to receive a message comprising a digital signature; determine whether a specific authorized certificate issuer is configured for a message originator within a data protection policy; and, in response to determining that the specific authorized certificate issuer is configured for the message originator within the data protection policy, determine whether a message originator certificate used to generate the digital signature is issued by the configured specific authorized certificate issuer.

DETAILED DESCRIPTION

Figure 1:
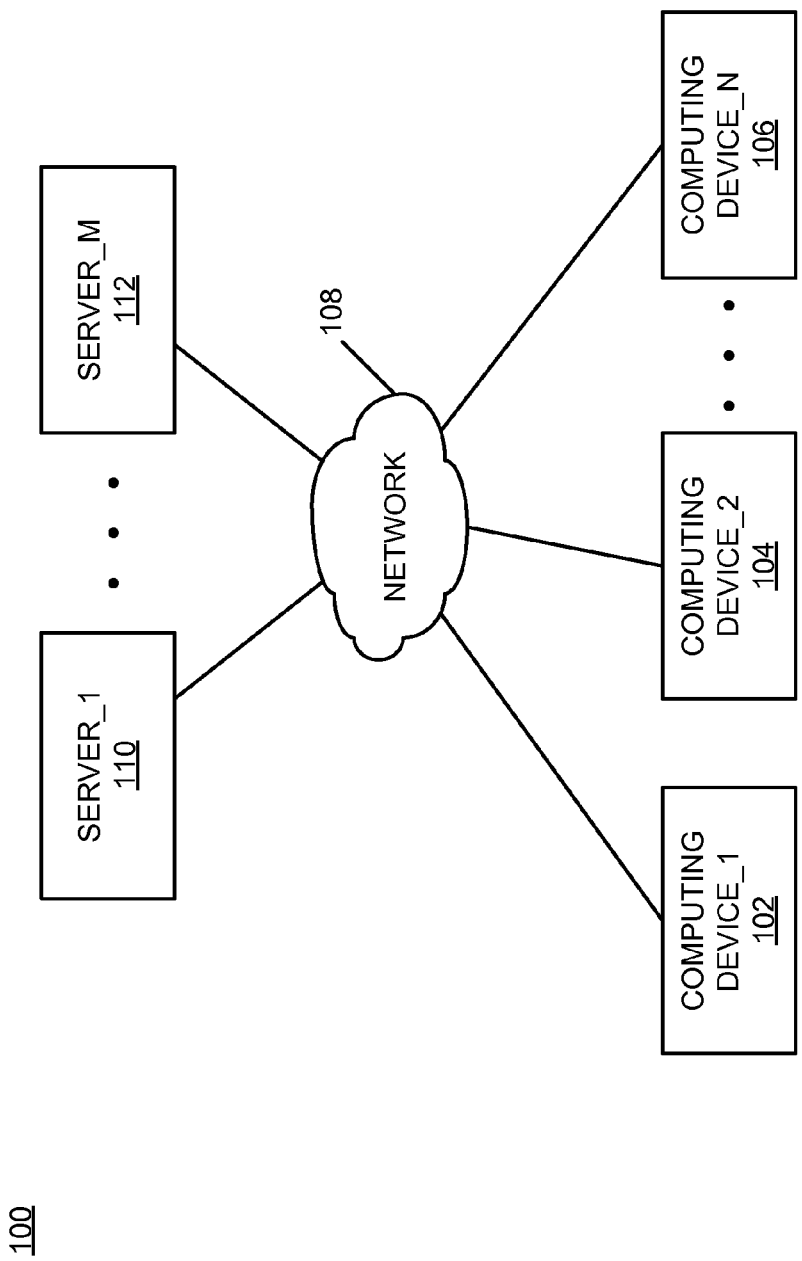
FIG. 1 is a block diagram of an example of an implementation of a system for automated digital certificate issuer-correlated digital signature verification according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides digital certificate issuer-correlated digital signature verification. The present subject matter enhances data protection policies to include configured specific authorized certificate issuers for digital certificates of message originators. The configured specific authorized certificate issuers may be utilized in response to message reception to determine whether a message originator certificate used to generate a digital signature of the received message is issued by the configured specific authorized certificate issuer. As such, certificates issued by certificate authorities (even trusted certificate authorities) other than the configured specific authorized certificate issuers may be detected. Accordingly, digital signature verification may be improved by use of the present subject matter. The processing described herein may be optionally configured at a granular level per message queue, per message originator, or otherwise as appropriate for a given implementation.

This technology described herein provides an approach to strengthening digital signature verification in secure messaging environments. The strengthened digital signature verification involves an extension of data-protection policies to allow the optional specification of a mandatory issuer of message originator certificates. Data-protection policies that may be configured to allow administrators to name authorized message originators, for example by specification of a certificate subject distinguished name (Subject DN), are extended to allow administrators to name a mandatory certificate issuer of the message originator certificate, for example by using an issuer distinguished name (Issuer DN). The mandatory certificate issuer designation may then be correlated with message originator identification during message processing for improved verification of digital signatures.

As such, the present technology expands the processing of message retrieval in a secure messaging environment to cause signature verification to include an additional check to verify that the message originator certificate is issued by the named issuer according to the extended data-protection policy. If the message originator's certificate is not issued by the designated issuer identified in the data-protection policy, the signature is deemed invalid.

For purposes of the present description, it is noted that one method of digitally signing messages is to use Public Key Infrastructure (PKI). Using PKI, the originator of a message may use a hashing algorithm on the message data to produce a digest. This digest is then encrypted with a private key of the originator and the resulting bit-string, called the "digital signature," may be added to the message payload. A recipient of the message may use a public key of the message originator to decrypt the digest and then compare the digest to a re-hash of the message data to confirm that the message data has not changed during transit by verifying that the decrypted digest and the re-hashed digest are identical. This method of digitally signing messages and verification of digital signatures may be used to confirm that the originator of the message possesses the private key that matches the public key used to decrypt the digest, and that the message data has not changed. The present technology provides an additional layer of digital signature verification to ensure that the digital certificate of the message originator was issued by a specific authorized certificate issuer, rather than any trusted certificate issuer. The terms "certificate issuer" and "certificate authority" are used interchangeably within the description herein.

The specification/correlation of a mandatory issuer of message originator certificates with message originator identifiers within data-protection policies may be applied at the secure messaging environment level (e.g., the system level) or at the message-queue level. At the system level, the specification of a mandatory issuer may be applied to all queues that do not have a queue-level specification. At the message queue level, the specification of a mandatory issuer may be applied to the associated queue or queues managed by the queue-level specification. If no message queue-level specification is configured, the system-level specification may be applied, if a system-level mandatory issuer specification is configured. If no specification of a mandatory issuer is configured, no check of message originator issuers is performed, which allows configurability and flexibility of configuration of the present technology across one or more systems and queues.

As such, using the present subject matter, digital signatures in secure messaging environments may not be deceptively created (e.g., forged) by issuing an authorized originator certificate using a different, but trusted, certificate authority (CA). Because of the flexibility of configuration and optional data-protection policy extensions, the present technology may be implemented within existing secure messaging environments without affecting the existing secure messaging environments. Additionally, the introduction of the present technology does not affect application programs because the additional check of the originator certificate issuer may be managed by the secure messaging environment rather than the retrieving application. No additional certificate distribution is required by the present technology because trusted CAs are already registered within secure messaging environments, and the new optional issuer specifications name a known and trusted CA. Accordingly, the present technology improves data security in message queuing environments.

In secure messaging environments, data-protection policies may stipulate how message data should be protected when it is placed on a queue, and specify how it should be verified and processed when a message is retrieved from a queue. A secure messaging environment ensures that these data-protection policies, if they exist, are applied as messages are placed onto the queues and as messages are retrieved from the queues.

In the case where a data-protection policy stipulates that message data should be digitally signed, the secure messaging environment may, for example, apply a hashing algorithm to the data when it is placed on a queue. The hashing algorithm produces a digest (bit-string). The secure messaging environment may also encrypt the digest with the private key of the originator to produce a digital signature. The digital signature may be added to the message payload so that the digital signature may be verified later by a retriever of the message.

During message retrieval, the secure messaging environment decrypts the signature using the public key of the originator to recover the digest. The secure messaging environment then compares the digest with a new hash of the received message data performed by the secure messaging environment. The new hash and the digest must be equivalent to confirm that the message data has not changed.

The public key used to decrypt the signature is an attribute of the originator's certificate. The originator's certificate also identifies the name of the certificate issuer (e.g., the distinguished name (DN) of the Certificate Authority (CA)) that issued the originator's certificate.

The present technology allows the secure messaging environment to verify that the certificate issuer identified in the message originator's certificate is the correct issuer of the message originator's certificate. The present technology also allows the secure messaging environment to verify that the issuer is a trusted CA by checking that the named CA is listed as trusted in the secure messaging environment of the retriever.

This secure messaging environment may be configured to perform the verification that the message originator's certificate is the correct certificate issuer for that particular message originator either before or after the verification of the trust of the CA of the originator certificate. To perform this verification, the secure messaging environment may check the relevant data-protection policy of the target queue, or a system-level policy, for a policy extension that indicates that the originator certificate must be issued by a specific/designated CA. If the message originator certificate is not issued by the issuer designated within the relevant data-protection policy, the message signature is deemed invalid.

For example, if a data-protection policy identifies an authorized originator of messages to a particular queue by a distinguished name (DN), such as a common name, organization, and country (e.g., "CN=ValidSender, O=CompanyName, C=AU"), then any message arriving on the queue associated with the data-protection policy will be deemed valid if it is signed by a message originator with this distinguished name. If there are, for example, two trusted certificate issuers (CAs), CA1 and CA2, the present technology expands the data-protection policy to indicate whether a mandatory issuer of the originator certificate is required.

An example data-protection policy extension may include, for example, both an authorized originator (AuthorizedOriginator) and a mandatory certificate issuer (Mandatory Issuer) within separate fields, as follows:

<AuthorizedOriginator>= "CN=ValidSender, O=CompanyName, C=AU"
<MandatoryIssuer>= "CN=CA1, O= CompanyName, C=AU"

As such, the above example utilizes a separate tag (e.g., MandatoryIssuer) within the data-protection policy to designate the mandatory certificate issuer (e.g., CA1) for the particular message originator designated as the authorized originator (AuthorizedOriginator).

Another example data-protection policy extension may include, for example, both an authorized originator (AuthorizedOriginator) and a mandatory certificate issuer (Mandatory Issuer) within the same field, as follows:

```
<AuthorizedOriginator> = "CN=ValidSender, O=CompanyName, C=AU,
MandatoryIssuer= CN=CA1, O= CompanyName, C=AU"
```

As such, within the example above, the single authorized originator tag (AuthorizedOriginator) is updated with the mandatory issuer information. Many other possibilities for configuration of data-protection policy extensions are possible and all are considered to be within the scope of the present subject matter.

Utilizing an extended data-protection policy, such as one of the examples above, the secure messaging environment may perform verification of the mandatory issuer of the message originator's certificate when a mandatory issuer is specified. For example, on message retrieval, the secure messaging environment may perform a certificate issuer verification check when the mandatory issuer is stipulated within the extended data-protection policy. The certificate issuer verification check may be used to ensure that the certificate issuer of the message originator's certificate is equivalent to the mandatory issuer named within the policy. As an additional example, if the message originator's certificate issuer was determined based upon the certificate issuer verification check to be CA2 (rather than the mandatory specified CA1), the secure messaging environment may determine that the signature of the message originator is invalid because CA2 is not named as the mandatory issuer within the data-protection policy, even though CA2 is listed as a trusted CA.

Additionally, as described above, the present subject matter allows for the mandatory issuer to be optionally specified at the system level, the queue level, or not at all. Additionally, granularity may be implemented such that the queue level may be designated, for example, to take precedence over the system level or vice versa. Using the present technology, digital signatures in secure messaging environments may not be deceptively created by issuing a message originator certificate using a different, but trusted, certificate authority.

It should be noted that conception of the present subject matter resulted from recognition of certain limitations associated with digital signature verification. For example, it was observed that within messaging environments where security of message data is critical, the environment may use data-protection policies that stipulate how messages should be protected. Such an environment may be referred to as a secure messaging environment. It was further observed that when a message is placed on a queue by an application, a data-protection policy may exist that stipulates that the message should be digitally signed by the originator. Similarly, it was observed that when a message is retrieved from a queue by an application, a data-protection policy may exist that stipulates that the message is expected to be signed and that the message signature should be verified. As such, the secure messaging environment applies these data-protection policies. However, it was determined that the verification of a digital signature as described, although it confirms that the message data has not changed, only confirms that the originator has the private key that matches the public key of the digital certificate that describes the originator. It was further observed that, for this reason, secure messaging environments also confirm that the digital certificate of the originator is issued by a "trusted" Certificate Authority (CA). If the issuer of the digital certificate is not a "trusted" CA, the message signature is deemed invalid. However, it was also further determined that, while a site that receives digitally signed messages may take care to only register CAs that they trust, a problem exists because that site may identify two or more trusted CAs, for example CA1 and CA2. In view of this determination, it was further determined that an entity that wants to circumvent the security of the messaging environment may generate a certificate using CA2 with details (e.g., encryption keys, distinguished names, etc.) that match a valid certificate that would be or that has been issued by CA1. It was determined that such a certificate issued by CA2 may circumvent system security because messages signed using that certificate would be accepted by existing secure messaging environments as valid because CA2 is a "trusted" CA (and because the certificate includes the correct decryption key, etc.), even though the certificate was issued by the wrong certificate authority. The present subject matter improves digital signature verification by correlating digital certificate issuers with digital signatures for digital signature verification. A digital signature verification policy extension is used to correlate digital certificate issuers with digital signatures for digital signature verification. As such, improved digital signature verification may be obtained through the digital certificate issuer-correlated digital signature verification described herein.

The digital certificate issuer-correlated digital signature verification described herein may be performed in real time to allow prompt verification of specified issuers of digital certificates used to sign messages. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated digital certificate issuer-correlated digital signature verification. A computing device_1 102, a computing device_2 104, through a computing device_N 106 communicate via a network 108 with a server_1 110 through a server_M 112. It should be noted that the configuration of FIG. 1 is one possible example of a system implementation and many variations of system implementations are possible. However, for purposes of clarity with respect to the present example, any device within the system 100 may operate locally or remotely with respect to any other device. Further, when running locally there is no cross-network involved between the respective local devices.

As will be described in more detail below in association with FIG. 2 through FIG. 5, the computing device_1 102 through the computing device_N 106 and the server_1 110 through the server_M 112 may provide automated digital certificate issuer-correlated digital signature verification, as appropriate for a given implementation. As such, multiple devices may collaboratively provide automated digital certificate issuer-correlated digital signature verification or a single device may provide automated digital certificate issuer-correlated digital signature verification.

The automated digital certificate issuer-correlated digital signature verification may be facilitated by a data protection service/module that interfaces between a requester device/application and a responder device/application. A queue manager application may also process queue management functionality at the direction of the data protection service/module. For purposes of brevity within the present description, the data protection service/module may be referred to herein as a data protection module. It is understood that one or more data protection modules may be utilized to implement the present subject matter as appropriate for a given implementation. Similarly, for brevity herein the requester device/module/application and the responder device/module/application may be referred to as a requester module and a responder module, though it is understood that one or more requester applications or responder applications may be associated with any particular device. It is further understood that where a requester module or a responder module are implemented other than completely in hardware, the respective application may be an application executed by one or more processors, as described in more detail below.

The automated digital certificate issuer-correlated digital signature verification facilitates policy extension to identify, within a policy, digital certificate issuers for originators of messages. The digital certificate issuers must be "trusted" certificate authorities (CAs) to be placed within the extended policy. Further, the CA placed within a policy for a message originator must be the CA that actually issued the message originator's digital certificate that is used by the message originator to digitally sign originated messages. As such, the extended policy may be used to verify that the CA identified in association with a particular message is the actual CA (and not just another "trusted" CA) that issued the message originator's digital certificate. Accordingly, a certificate issued by another unauthorized, but "trusted," CA may be detected and the message may be rejected based upon the digital certificate issuer-correlated digital signature verification described herein.

For purposes of the examples that follow, a "PUT" request for a request message initiated by a requester module may be intercepted by the data protection module for a requester application and processed according to a request queue policy associated with a request queue of the requester application. Conversely, a "GET" request for a request message from a responder module may be intercepted by the data protection module for a responder application and processed according to a request queue policy associated with a request queue associated with the responder application.

Similarly, a "PUT" request for a response message initiated by a responder module may be intercepted by the data protection module for a responder application and processed according to a response/reply queue policy associated with a response/reply queue of the responder application. Conversely, a "GET" request for a response message from a requester module may be intercepted by the data protection module for a requester application and processed according to a response/reply queue policy associated with a response/reply queue associated with the requester application.

It should be noted that the computing device_1 102 through the computing device_N 106, and/or the server_1 110 through the server_M 112, may be a portable computing device, either by a user's ability to move the respective device to different locations, or by the respective device's association with a portable platform, such as a plane, train, automobile, or other moving vehicle. It should also be noted that the computing device_1 102 through the computing device_N 106 and the server_1 110 through the server_M 112 may be any computing device capable of processing information as described above and in more detail below. For example, any of the respective computing devices may include devices such as a mainframe computer, a distributed computing device within a distributed network of computing devices, a personal computer (e.g., desktop, laptop, etc.) or a handheld device (e.g., cellular telephone, personal digital assistant (PDA), email device, music recording or playback device, etc.), or any other device capable of processing information as described in more detail below.

The network 108 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 110 through the server_M 112 may include any device capable of providing data for consumption by a device, such as the computing device_1 102 through the computing device_N 106, via a network, such as the network 108. For example, the server_1 110 through the server_M 112 may each represent a web server, an application server, or other data server device, as appropriate for a given implementation.

Figure 2:
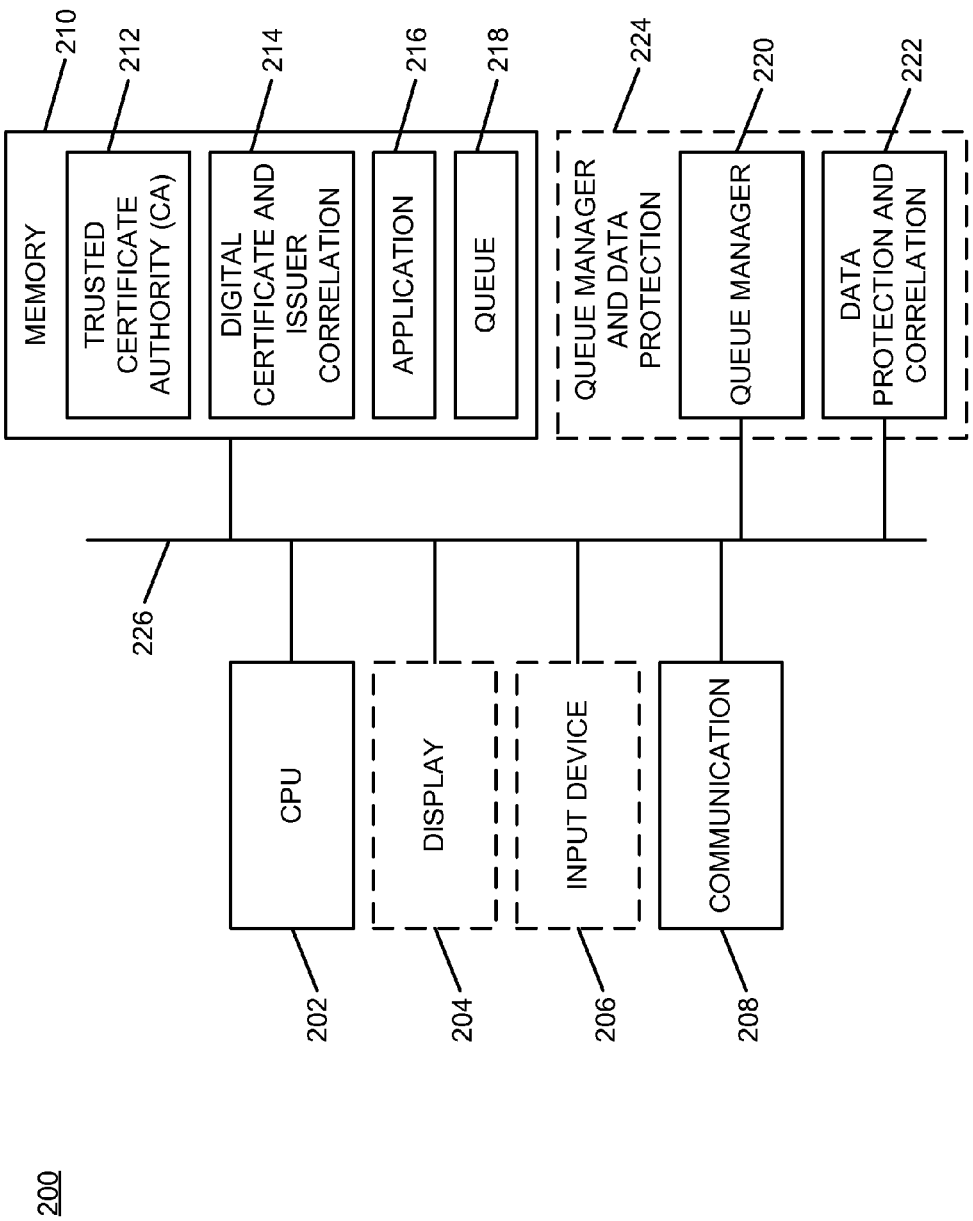
FIG. 2 is a block diagram of an example of an implementation of a core processing module capable of performing automated digital certificate issuer-correlated digital signature verification according to an embodiment of the present subject matter.

FIG. 2 is a block diagram of an example of an implementation of a core processing module 200 capable of performing automated digital certificate issuer-correlated digital signature verification. The core processing module 200 may be associated with any of the computing device_1 102 through the computing device_N 106 and/or any of the server_1 110 through the server_M 112, as appropriate for a given implementation. Further, the core processing module 200 may provide different and complementary processing for verification of digital signatures by correlation of a message originator's digital certificate issuing certificate authority (CA) with the actual digital signature within messages originated by the respective message originator in association with each implementation, as described in more detail below. The core processing module 200 is capable of performing automated digital certificate issuer-correlated digital signature verification. A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100, such as the computing device_1 102 through the computing device_N 106 and the server_1 110 through the server device_M 112, to perform the automated digital certificate issuer-correlated digital signature verification described herein. The communication module 208 may include any electrical, protocol, and protocol conversion capabilities useable to provide the interconnection capabilities.

A memory 210 includes a trusted certificate authority (CA) storage area 212, a digital certificate and issuer correlation information storage area 214, an application area 216, and a queue storage area 218. The trusted CA storage area 212 stores information that identifies trusted CAs within the system 100, such as trusted issuer certificates which include issuer distinguished names (DNs). The digital certificate and issuer correlation information storage area 214 stores information that correlates trusted CAs with particular digital certificates issued by those trusted CAs. The digital certificate and issuer correlation information storage area 214 may also store configuration information, such as to enable the processing described herein. For example, in association with complex messaging environments, one or more recipients may be configured to perform the automated digital certificate issuer-correlated digital signature verification described herein, while other message recipients may be configured to process message reception without such processing. Accordingly, the present technology may be implemented with a highly-granular configurability across one or more system implementations.

As described above and in more detail below, the digital certificate and issuer correlation information may be used to verify digital signatures within messages to ensure that the signatures are generated using digital certificates from specific issuers (rather than just an issuer from a pool of trusted issuers). The application area 216 represents storage and execution space for one or more applications, such as one or more requester applications and/or one or more responder applications. The queue storage area 218 stores queues that may include one or more request queues and one or more reply queues.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter. It should be noted that the memory 210 represents a general implementation of a storage device and that any suitable device capable of storing the data described herein may be used, such as for example a hard disk or other device, as described in more detail below.

A queue manager module 220 provides queue management processing for the core processing module 200, such as placement of messages onto and retrieval of messages from queues stored within the queue storage area 218, as described above and in more detail below. A data protection and correlation module 222 is also shown. The data protection and correlation module 222 implements the automated digital certificate issuer-correlated digital signature verification of the core processing module 200. The data protection and correlation module 222 intercepts messaging, such as request messages or response/reply messages, from message originators (e.g., requester applications or responder applications, respectively) that may be executing locally within the application area 216 or remotely at another device. The data protection and correlation module 222 processes extended policy information, as described above and in more detail below, to verify that digital signatures within messages from message originators are generated using the digital certificate correlated with that particular message originator within the digital certificate and issuer correlation information storage area 214.

It is additionally noted that a queue manager and data protection module 224 is illustrated via a dashed-line representation within FIG. 2. The queue manager and data protection module 224 is shown to include both the queue manager module 220 and the data protection and correlation module 222, and is illustrated by the dashed-line representation to indicate that the queue manager module 220 and the data protection and correlation module 222 may be implemented within a single module as appropriate for the given implementation.

It should also be noted that the queue manager module 220 and the data protection and correlation module 222 (and also the queue manager and data protection module 224) may form a portion of other circuitry described without departure from the scope of the present subject matter. Further, these modules may alternatively be implemented as an application stored within the memory 210. In such an implementation, these modules may include instructions executed by the CPU 202 for performing the functionality described herein. The CPU 202 may execute these instructions to provide the processing capabilities described above and in more detail below for the core processing module 200. These modules may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, the queue manager module 220, the data protection and correlation module 222, and the queue manager and data protection module 224 are interconnected via an interconnection 226. The interconnection 226 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
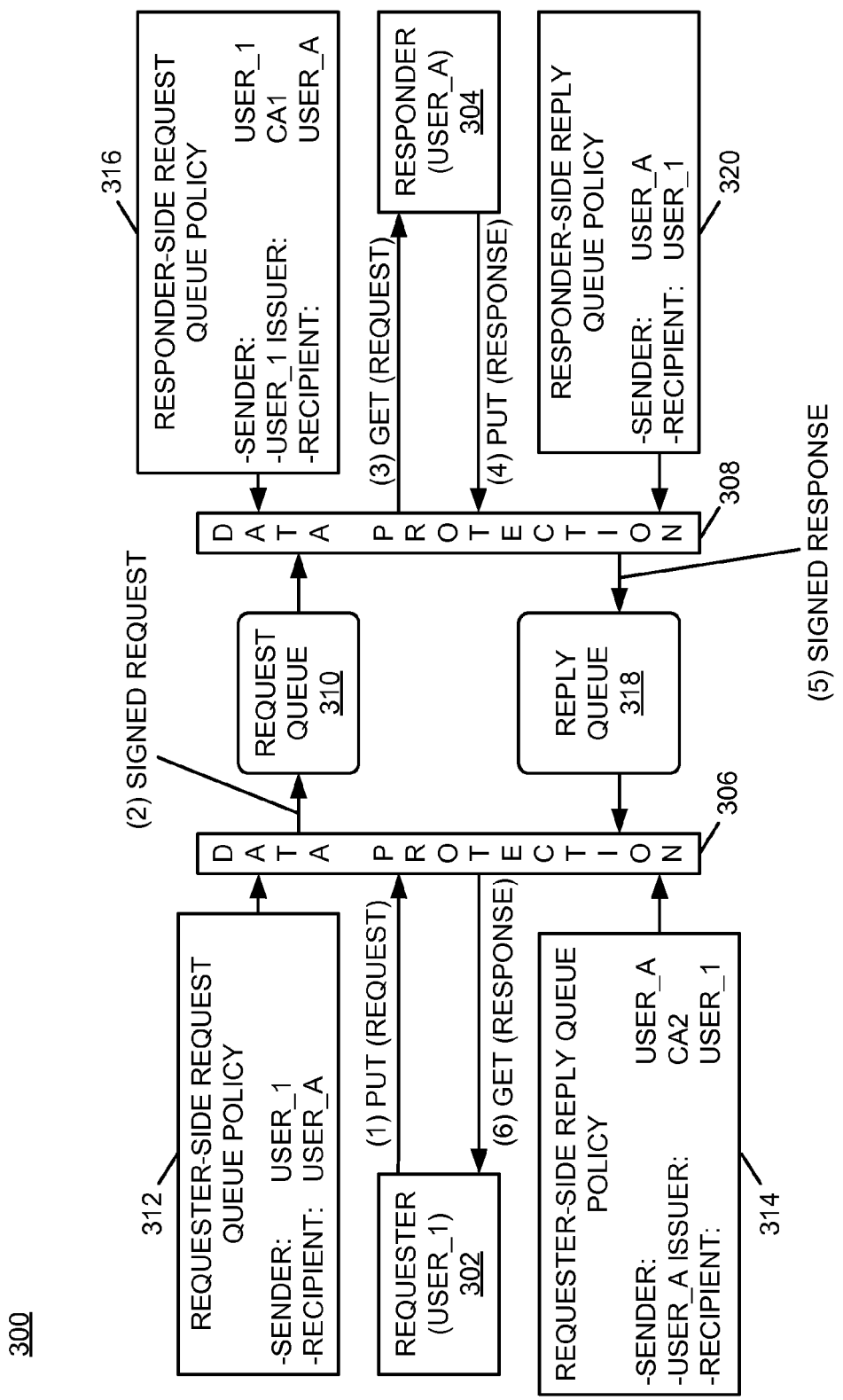
FIG. 3 is a logical block diagram of an example of an implementation of a messaging interaction that illustrates digital certificate issuer-correlated digital signature verification based upon an extended request queue policy from a perspective of a responder and an extended reply queue policy from a perspective of a requester according to an embodiment of the present subject matter.
Figure 4:
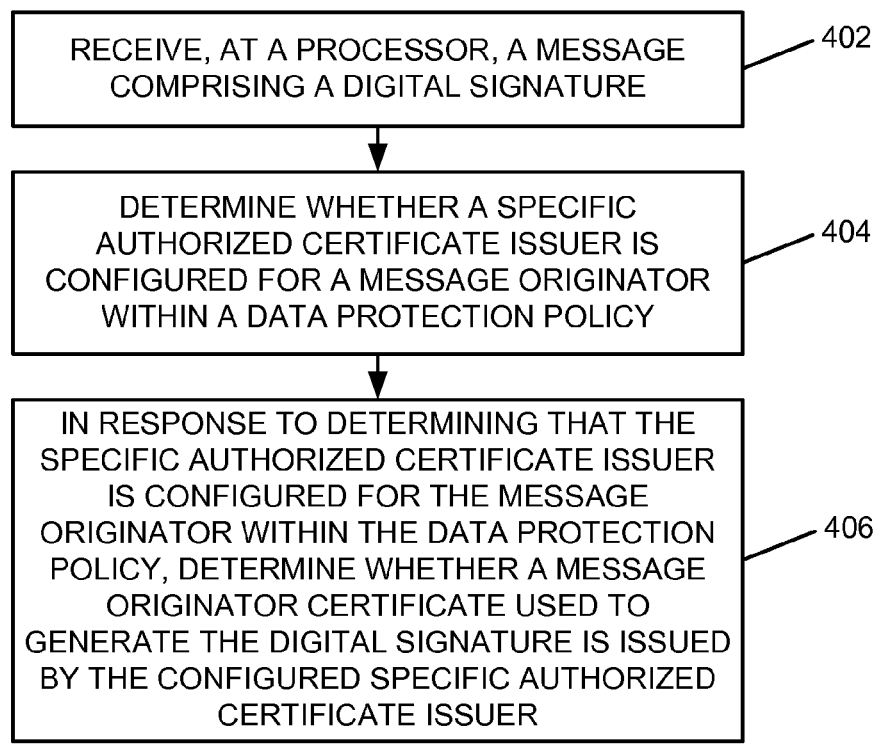
FIG. 4 is a flow chart of an example of an implementation of a process for automated digital certificate issuer-correlated digital signature verification according to an embodiment of the present subject matter.
Figure 5:
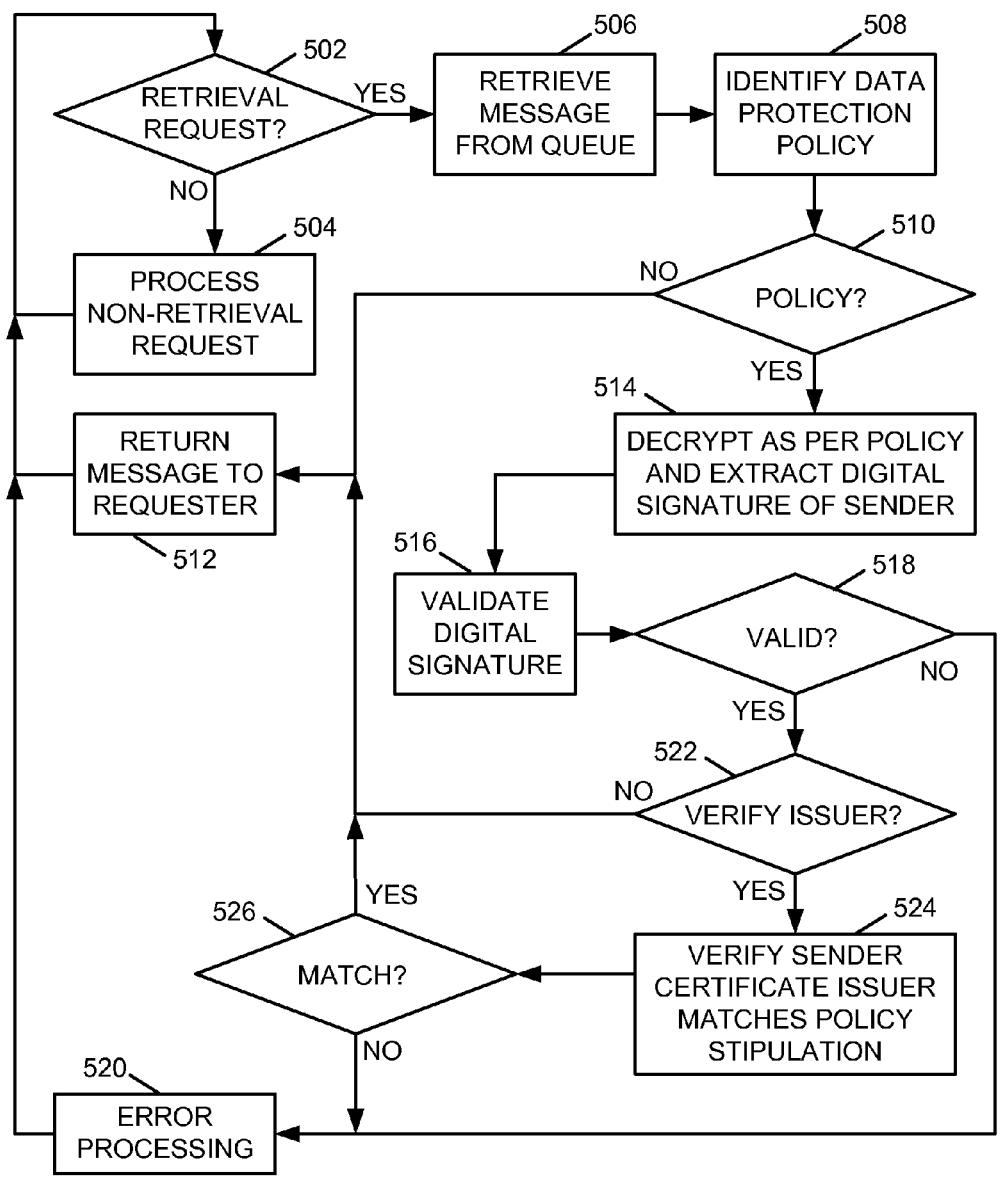
FIG. 5 is a flow chart of an example of an implementation of a process for automated digital certificate issuer-correlated digital signature verification according to an embodiment of the present subject matter.

FIG. 3 is a logical block diagram of an example of an implementation a messaging interaction 300 that illustrates digital certificate issuer-correlated digital signature verification based upon an extended request queue policy from a perspective of a responder and an extended reply queue policy from a perspective of a requester. As a logical block diagram, details of the mapping of the respective components of FIG. 3 onto the example architecture of the core processing module 200 of FIG. 2 may be understood by review of the details of the core processing module 200 described above. These details are omitted from FIG. 3 to eliminate crowding within the drawing content of FIG. 3. It should additionally be noted that the example of FIG. 3 illustrates processing within a "request-reply" messaging environment for ease of illustration of certain configurability options. However, this should not be considered limiting because the present subject matter may be implemented within any messaging environment and any message reception situation, and all such messaging environments and message reception situations are considered within the scope of the present subject matter. As such, the requester and responder sides represent two discrete examples of the present technology and neither requires the other to implement the subject matter described herein. FIGS. 4 and 5 below show flow charts of processing that may be implemented for any such message reception situation.

It should additionally be noted that in certain messaging environments, certain types of messages may be more highly scrutinized than others to verify certificate authorities that issued certificates, as appropriate for a given implementation. For example, message responders may be independently configured to verify certificate authorities that issued certificates of originator modules that issue information request messages for certain types of information and not for other types of information requests. Similarly, message originators may be independently configured to verify certificate authorities that issued certificates of response modules that issue response messages for certain types of responses and not for other types of responses. Further, responders and originators may be configured to verify certificate authorities that issued certificates of certain other respective modules and not for other modules, again as appropriate for a given implementation. As such, the present technology is highly configurable across a variety of systems and system implementations, and all such systems and system implementations are considered within the scope of the present subject matter.

It should further be noted that separate queue manager modules, such as the queue manager module 220, are also omitted from FIG. 3 to avoid crowding within the drawing content of FIG. 3. However, it is understood that a queue manager module functions to process message placement to and retrieval from queues, and that queues may be stored, for example, within one or more queue storage areas such as the queue storage area 218 described above. Additionally, data protection modules, such as the data protection and correlation module 222, may be implemented as one or more data protection modules. Policies, including request queue policies and reply queue policies may be stored, for example, within one or more queue management storage areas such as the queue storage area 218. For any implementation including more than one of any such component, the multiple components may be implemented within one or more devices, and as such, within one or more core processing modules 200. In view of the significant number of variations in implementation, details of the mapping of the components of FIG. 3 to any specific architecture are omitted herein for brevity and may vary based upon the description herein as appropriate for any given implementation.

Referring to FIG. 3, a Requester (USER_1) 302 interacts with a Responder (USER_A) 304 in a request-reply operation within a digital certificate issuer-correlated digital signature verification implementation. For purposes of the present example, it is assumed that both request and reply messages, including both request messages and reply messages, are digitally signed and that policies associated with receiving queues are extended to include digital certificate issuer information for the sender (message originator) of the respective messages.

A data protection module 306 protects data and messages for the Requester (USER_1) 302 by signing messaging sent from the Requester (USER_1) 302 and verifying message signatures received by the Requester (USER_1) 302. Additionally, the data protection module 306 processes reply messages from the Responder (USER_A) 304 using a Reply Queue Policy 314 for the Reply Queue 318 that is extended with certificate issuer information (e.g., "USER_A ISSUER: CA2") for the Responder (USER_A) 304. This extended certificate issuer information is used to verify a digital signature of the Responder (USER_A) 304 using digital certificate issuer-correlated digital signature verification, as described above and in more detail below.

A data protection module 308 protects data and messages for the Responder (USER_A) 304 by verifying message signatures received by the Responder (USER_A) 304 and signing messaging sent from the Responder (USER_A) 304. Additionally, the data protection module 308 processes request messages from the Requester (USER_1) 302 using a Request Queue Policy 316 for the Request Queue 310 that is extended with certificate issuer information (e.g., "USER_1 ISSUER: CA1") for the Requester (USER_1) 302. This extended certificate issuer information is used to verify a digital signature of the Requester (USER_1) 302 using digital certificate issuer-correlated digital signature verification, as described above and in more detail below.

The logical flow of the messaging interaction 300 begins with the Requester (USER_1) 302 initiating a "PUT" for a request message at logical flow point (1) within FIG. 3 (e.g., "(1) PUT (REQUEST)"). The request message includes a static request queue name for a Request Queue 310. The Request Queue 310 has an associated Request Queue Policy 312 on the requester side of the messaging interaction. The requester-side Request Queue Policy 312 identifies the sender of the request message as "USER_1," which represents the Requester (USER_1) 302, and lists one potential responder as "USER_A," which represents the Responder (USER_A) 304. Additional potential responders may be listed as appropriate for a given implementation. As such, the Responder (USER_A) 304 is a potential recipient and, in this example, a responder to the request message. It should be noted that the identity of the sender may be identified by examining the operating system assigned user identifier (ID) associated with the requester application. As such, it may or may not be available within and to be extracted from the requester-side Request Queue Policy 312. Additionally, the requester-side Request Queue Policy 312 may have more than one valid sender. In such a situation, the associated user ID associated with the requester application may be used to determine which of the authorized requester applications has issued the particular request message.

In response to the "PUT" request for the request message at logical flow point (1) within FIG. 3 (e.g., "(1) PUT (REQUEST)") by the Requester (USER_A) 302, the data protection module 306 analyzes the request message and the requester-side Request Queue Policy 312 to determine the Requester (USER_A) 302 certificate to use to sign the request message for the intended recipient, Responder (USER_A) 304. It should be noted that the reply queue name is provided in the request message. During request message creation, the requester module may add that predefined reply queue name to the request message.

A requester-side Reply Queue Policy 314 identifies the sender, recipient, and includes an extended field "USER_A ISSUER: CA2" that specifies the digital certificate issuer of the Responder (USER_A) 304. It should be noted that the "SENDER" and "RECIPIENT" fields of the requester-side Request Queue Policy 312 (e.g., USER_1 and USER_A, respectively) are swapped to form the "SENDER" and "RECIPIENT" fields of the requester-side Reply Queue Policy 314 (e.g., USER_A and USER_1, respectively) in this example.

Requester applications/modules may be configured to "know" the names of the request queues that they choose to use to "PUT" request messages. The requester applications/modules tell the respective queue manager to "PUT" a request message to a particular request queue and the responder applications/modules tell the respective queue manager to "PUT" the response message to the respective reply queue. A queue manager (not shown within FIG. 3) places the request message on the designated request queue and the reply message on the designated reply queue. The data protection module 306 (and 308) sits between the respective requester or responder applications, respectively, and the queue manager so that the data protection module 306 (and 308) may intercept these requests. This allows the data protection module 306 (and 308) to sign and verify signatures "on the fly" during run time. The requester application may request the queue manager use a specific queue name. The requester application subsequently uses this name when it gets reply messages. The data protection module 306 digitally signs the request message using the digital certificate of the sender (e.g., the Requester (USER_1) 302. It is this digital signature that may be verified by the data protection module 308, as described in more detail below. The data protection module 306 submits the digitally-signed request message to the queue manager for placement on the Request Queue 310. The queue manager places the digitally-signed request message on the Request Queue 310 at logical flow point (2) within FIG. 3 (e.g., (2) SIGNED REQUEST).

The Request Queue 310 also has an associated responder-side Request Queue Policy 316 on the responder side of the messaging interaction. It should be noted that if the requester and responder are executing on the same host, the requester-side Request Queue Policy 312 and the responder-side Request Queue Policy 316 may be the same policy. Similar to the requester-side Request Queue Policy 312, the responder-side Request Queue Policy 316 identifies the sender of the request message as "USER_1," which represents the Requester (USER_1) 302, and lists one potential responder as "USER_A," which represents the Responder (USER_A) 304. Additional potential responders may be listed as appropriate for a given implementation. As such, the responder-side Request Queue Policy 316 also identifies the Responder (USER_A) 304 as a potential recipient and, in this example, a responder to the request message.

In response to the "GET" request for the request message at logical flow point (3) within FIG. 3 (e.g., "(3) GET (REQUEST)") by the Responder (USER_A) 304, the data protection module 308 determines whether it is configured to perform certificate issuer verification, such as for example, by determining whether the configuration information is set to active within the digital certificate and issuer correlation information storage area 214. If configured to perform the certificate issuer verification, the data protection module 308 analyzes the request message and the responder-side Request Queue Policy 316 to determine an appropriate digital certificate issuer for the sender of the message (e.g., USER_1 ISSUER: CA1).

Similar to the requester-side, a responder-side Reply Queue Policy 320 identifies the sender and recipient for reply messages. It should be noted that if requester and responder are operating on the same host, the requester-side Reply Queue Policy 314 and the responder-side Reply Queue Policy 320 may be the same policy. The responder-side Reply Queue Policy 320 includes the authorized sender(s) of a reply message (e.g., USER_A within the present example), the recipient of the reply message "USER_1," which represents the Requester (USER_1) 302.

It should be noted that the "SENDER" and "RECIPIENT" fields of the responder-side Request Queue Policy 316 (e.g., USER_1 and USER_A, respectively) are swapped to form the "SENDER" and "RECIPIENT" fields of the responder-side Reply Queue Policy 320 (e.g., USER_A and USER_1, respectively) in this example.

The data protection module 308 verifies the digital signature of the sender, the Requester (USER_1) 302, within the request message. For example, the data protection module 308 may use a public key of the message originator, the Requester (USER_1) 302, to decrypt a digest included within the payload of the message, may perform an independent re-hash of the message data, and then compare the digest to the independent re-hash of the message data to confirm that the message data has not changed during transit by verifying that the decrypted digest and the independently re-hashed digest are identical. The data protection module 308 additionally verifies that the digital signature was created using a digital certificate issued by certificate authority CA1 represented within the responder-side Request Queue Policy 316 for the sender, the Requester (USER_1) 302 (and not just any "trusted" CA). As such, the data protection module 308 correlates the correct/authentic certificate issuer of the message originator with the message originator itself to perform the enhanced signature verification. The data protection module 308 provides the verified message to the Responder (USER_A) 304 for processing. In response to completion of processing the request message, the Responder (USER_A) 304 initiates a "PUT" request for a response message at logical flow point (4) within FIG. 3 (e.g., "(4) PUT (RESPONSE)").

The data protection module 308 also verifies that the Responder (USER_A) 304 is an authorized responder to the request message. If the Responder (USER_A) 304 is an authorized responder to the request message, the data protection module 308 digitally signs the message on behalf of the Requester (USER_1) 302, and submits the signed response message for placement on the Reply Queue 318 to the queue manager (not shown) at logical flow point (5) within FIG. 3 (e.g., (5) SIGNED RESPONSE).

In response to the "GET" request for the response message at logical flow point (6) within FIG. 3 (e.g., "(6) GET (RESPONSE)") by the Requester (USER_1) 302, the data protection module 306 analyzes the requester-side Reply Queue Policy 314 to identify all authorized responders to the original request message. The data protection module 306 determines whether the responder is an authorized responder and listed within the requester-side Reply Queue Policy 314. If the responder is listed as an authorized responder, the data protection module 306 verifies the digital signature associated with the message.

The data protection module 306 also determines whether it is configured to perform certificate issuer verification, such as for example, by determining whether the configuration information is set to active within the digital certificate and issuer correlation information storage area 214. If configured to perform the certificate issuer verification, the data protection module 306 also analyzes the requester-side Reply Queue Policy 314 to determine an appropriate digital certificate issuer for the sender of the message (e.g., USER_A ISSUER: CA2).

The data protection module 306 further verifies the digital signature of the sender, the Responder (USER_A) 304, within the response message. For example, the data protection module 306 may use a public key of the message originator, the Responder (USER_A) 304, to decrypt a digest included within the payload of the message, may perform an independent re-hash of the message data, and then compare the digest to the independent re-hash of the message data to confirm that the message data has not changed during transit by verifying that the decrypted digest and the independently re-hashed digest are identical. The data protection module 306 additionally verifies that the digital signature was created using a digital certificate issued by certificate authority CA2 represented within the requester-side Reply Queue Policy 314 for the sender, the Responder (USER_A) 304 (and not just any "trusted" CA). As such, the data protection module 306 correlates the correct/authentic certificate issuer of the message originator with the message originator itself to perform the enhanced signature verification. The data protection module 306 provides the verified response message to the Requester (USER_1) 302.

As such, the data protection module 306 and the data protection module 308 each provide digital certificate issuer-correlated digital signature verification for request messages and response messages, respectively. As described above, certificate authorities are correlated with message sender identities within queue policies associated with receiving queues for messages. Further, the digital signatures of messages are verified not only for accuracy, but also to ensure that the digital signature was generated using a digital certificate issued by specific (and accurate) certificate authority and not just any "trusted" certificate authority. As such, the data protection module 306 and the data protection module 308 each provide automated digital certificate issuer-correlated digital signature verification and prevent certificates issued by other unauthorized, but "trusted," certificate authorities from being accepted by the messaging environment.

FIG. 4 through FIG. 5 described below represent example processes that may be executed by devices, such as the core processing module 200, to perform the automated digital certificate issuer-correlated digital signature verification associated with the present subject matter. Many other variations on the example processes are possible and all are considered within the scope of the present subject matter. The example processes may be performed by modules, such as the data protection and correlation module 222 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for automated digital certificate issuer-correlated digital signature verification. At block 402, the process 400 receives, at a processor, a message comprising a digital signature. At block 404, the process 400 determines whether a specific authorized certificate issuer is configured for a message originator within a data protection policy. At block 406, the process 400, in response to determining that the specific authorized certificate issuer is configured for the message originator within the data protection policy, determines whether a message originator certificate used to generate the digital signature is issued by the configured specific authorized certificate issuer.

FIG. 5 is a flow chart of an example of an implementation of a process 500 for automated digital certificate issuer-correlated digital signature verification. At decision point 502, the process 500 makes a determination as to whether a detected request is a message retrieval request (e.g., a "GET" request) to process a message via a queue within a messaging environment, such as the system 100. In response to determining that the detected request is not a message retrieval request at decision point 502, the process 500 processes the non-retrieval request at block 504. For example, the non-retrieval request may be an open, put, or close request. In response to processing the non-retrieval request at block 504, the process 500 returns to decision point 502 and iterates as described above.

In response to determining that the detected request is a retrieval request to process a message via a queue at decision point 502, the process 500 retrieves the message from the respective queue associated with the request at block 506. It should be noted that the message may include a queue name or a data protection module may assign the message to a queue as appropriate for a given implementation.

At block 508, the process 500 attempts to identify a data protection policy associated with the identified queue. At decision point 510, the process 500 makes a determination as to whether a data protection policy has been identified in association with the identified queue. In response to determining that a data protection policy has not been identified in association with the identified queue, the process 500 returns the message to the requester at block 512. The process 500 returns to decision point 502 and iterates as described above.

Returning to the description of decision point 510, in response to determining that a data protection policy has been identified in association with the identified queue, the process 500 decrypts the message per the data protection policy (if appropriate) and extracts the digital signature of the sender/originator at block 514. At block 516, the process 500 validates the digital signature of the sender/originator. At decision point 518, the process 500 makes a determination as to whether the digital signature is valid. In response to determining that the digital signature is not valid, the process 500 generates an error at block 520 and returns to decision point 502 and iterates as described above.

Returning to the description of decision point 518, in response to determining that the digital signature is valid, the process 500 makes a determination at decision point 522 as to whether the process 500 is configured to perform certificate issuer verification for the message sender/originator certificate. As such, the process 500 may be configured to implement the digital certificate issuer-correlated digital signature verification described herein. The configuration may be implemented, for example, using configuration information within a configuration area such as the digital certificate and issuer correlation information storage area 214 described above.

In response to determining at decision point 522 that the process 500 is not configured to perform certificate issuer verification for the message sender/originator certificate, the process 500 returns the message to the requester at block 512. The process 500 returns to decision point 502 and iterates as described above.

Returning to the description of decision point 522, in response to determining that the process 500 is configured to perform certificate issuer verification for the message sender/originator certificate, the process 500 verifies that the sender certificate issuer matches the data protection policy stipulation of the authorized certificate issuer for this message sender/originator at block 524. At decision point 526, the process 500 makes a determination as to whether the identified certificate issuer within the digital certificate of the sender/originator matches the authorized certificate issuer for this message sender/originator stipulated within the data protection policy.

In response to determining that the identified certificate issuer within the digital certificate of the sender/originator matches the authorized certificate issuer for this message sender/originator stipulated within the data protection policy, the process 500 returns the message to the requester at block 512. The process 500 returns to decision point 502 and iterates as described above.

Returning to the description of decision point 526, in response to determining that the identified certificate issuer within the digital certificate of the sender/originator does not match the authorized certificate issuer for this message sender/originator stipulated within the data protection policy, the process 500 generates an error at block 520 and returns to decision point 502 and iterates as described above.

As such, the process 500 provides enhanced verification of digital signatures. The process 500 verifies digital signatures to ensure authenticity of message originators and verifies digital signatures to ensure that correct/specific certificate issuers for the respective message originators are specified within digital signatures. Accordingly, the process 500 utilizes enhanced digital signature verification based upon correlation between message originators and specific authorized certificate issuers.

As described above in association with FIG. 1 through FIG. 5, the example systems and processes provide digital certificate issuer-correlated digital signature verification. Many other variations and additional activities associated with digital certificate issuer-correlated digital signature verification are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   a memory configured to store a data protection policy, where the data protection policy comprises one of a system-wide data protection policy and a target queue-level data protection policy, and if the data protection policy comprises the target queue-level data protection policy and a separate system-wide data protection policy is also specified, then the target queue-level data protection policy takes precedence over the separate system-wide data protection policy; and
   a processor programmed to:
      receive a message comprising a digital signature of a message originator;
      determine, in response to determining that the message originator is authorized by the data protection policy to originate the message, whether a specific authorized certificate issuer is configured for the message originator within the data protection policy; and
      in response to determining that the specific authorized certificate issuer is configured for the message originator within the data protection policy:
         determine whether a message originator certificate used to generate the digital signature of the message originator is issued by the specific authorized certificate issuer configured for the message originator within the data protection policy.

2. The system of claim 1, where, in being programmed to determine whether the message originator certificate used to generate the digital signature of the message originator is issued by the specific authorized certificate issuer configured for the message originator within the data protection policy, the processor is programmed to:
   identify an indicated certificate issuer of the message originator identified within the message originator certificate;
   compare the indicated certificate issuer of the message originator identified within the message originator certificate with the specific authorized certificate issuer configured for the message originator within the data protection policy; and determine whether the indicated certificate issuer matches the specific authorized certificate issuer configured for the message originator within the data protection policy.

3. The system of claim 1, where the processor is further programmed to identify, in response to determining that the message originator certificate used to generate the digital signature is not issued by the specific authorized certificate issuer configured for the message originator within the data protection policy, the digital signature as an invalid digital signature.

4. The system of claim 1, where the processor is further programmed to identify, in response to determining that the message originator certificate used to generate the digital signature is issued by the specific authorized certificate issuer configured for the message originator within the data protection policy, the digital signature as a valid digital signature.

5. The system of claim 4, where the processor is further programmed to verify, in response to identifying the digital signature as the valid digital signature, the digital signature of the message originator within the received message.

6. A computer program product comprising a computer readable storage medium including computer readable program code, where the computer readable program code when executed on a computer causes the computer to:
  receive a message comprising a digital signature of a message originator;
  determine, in response to determining that the message originator is authorized by a data protection policy to originate the message, whether a specific authorized certificate issuer is configured for the message originator within the data protection policy, where the data protection policy comprises one of a system-wide data protection policy and a target queue-level data protection policy, and if the data protection policy comprises the target queue-level data protection policy and a separate system-wide data protection policy is also specified, then the target queue-level data protection policy takes precedence over the separate system-wide data protection policy; and
  in response to determining that the specific authorized certificate issuer is configured for the message originator within the data protection policy: determine whether a message originator certificate used to generate the digital signature of the message originator is issued by the specific authorized certificate issuer configured for the message originator within the data protection policy.

7. The computer program product of claim 6, where, in causing the computer to determine whether the message originator certificate used to generate the digital signature of the message originator is issued by the specific authorized certificate issuer configured for the message originator within the data protection policy, the computer readable program code when executed on the computer causes the computer to:
  identify an indicated certificate issuer of the message originator identified within the message originator certificate;
  compare the indicated certificate issuer of the message originator identified within the message originator certificate with the specific authorized certificate issuer configured for the message originator within the data protection policy; and
  determine whether the indicated certificate issuer matches the specific authorized certificate issuer configured for the message originator within the data protection policy.

8. The computer program product of claim 6, where the computer readable program code when executed on the computer further causes the computer to identify, in response to determining that the message originator certificate used to generate the digital signature is not issued by the specific authorized certificate issuer configured for the message originator within the data protection policy, the digital signature as an invalid digital signature.

9. The computer program product of claim 6, where the computer readable program code when executed on the computer further causes the computer to identify, in response to determining that the message originator certificate used to generate the digital signature is issued by the specific authorized certificate issuer configured for the message originator within the data protection policy, the digital signature as a valid digital signature.

10. The computer program product of claim 9, where the computer readable program code when executed on the computer further causes the computer to verify, in response to identifying the digital signature as the valid digital signature, the digital signature of the message originator within the received message.

* * * * *